United States Patent [19]

Aizawa et al.

[11] Patent Number: 4,501,790
[45] Date of Patent: Feb. 26, 1985

[54] FIBER-REINFORCED URETHANE MOLDING PROVIDED WITH COATING FILMS

[75] Inventors: Makoto Aizawa; Tsuneo Kishimoto; Yoshio Tanimoto, all of Hiroshima, Japan

[73] Assignee: Mazda Motor Corporation, Hiroshima, Japan

[21] Appl. No.: 631,800

[22] Filed: Jul. 17, 1984

[30] Foreign Application Priority Data

Jul. 21, 1983 [JP] Japan ................. 58-133655

[51] Int. Cl.³ ................. B32B 5/16
[52] U.S. Cl. ................. 428/283; 428/290; 428/328; 428/402; 428/423.3; 428/425.9
[58] Field of Search ............ 428/268, 273, 283, 290, 428/328, 402, 403, 423.3, 425.9, 148; 427/205

[56] References Cited

U.S. PATENT DOCUMENTS 3,473,951 10/1969 DeRossi et al. ............... 428/425.9
4,061,815 12/1977 Poole ............................ 428/425.9
4,350,735 9/1982 Saitoh .......................... 428/425.9
4,356,230 10/1982 Emanuel et al. ............... 428/423.3
4,369,225 1/1983 Manabe et al. ................ 428/423.3
4,455,340 6/1984 Okina ........................... 428/423.3

FOREIGN PATENT DOCUMENTS

3043485 5/1981 Fed. Rep. of Germany ... 428/425.9

Primary Examiner—James J. Bell
Attorney, Agent, or Firm—Gerald J. Ferguson, Jr.; Joseph J. Baker

[57] ABSTRACT

A fiber-reinforced urethane molding comprises a molded urethane layer reinforced by inclusion of reinforcing fibers, and a hard urethane-based coating film overlaid on the surface of the molded urethane layer. The hard urethane-based coating film contains aluminum flakes dispersed therein in an amount within the range of 5% to 40% by weight, whereby projection of the reinforcing fibers out of the surface of the molded urethane layer is prevented by the aluminum flakes and the coated urethane molding exhibits high distinctness of image gloss.

20 Claims, 16 Drawing Figures

FIBER-REINFORCED URETHANE MOLDING PROVIDED WITH COATING FILMS

BACKGROUND OF THE INVENTION

1. Field of the Invention

This invention relates to a fiber-reinforced urethane molding provided with coating films. This invention particularly relates to a fiber-reinforced urethane molding provided with coating films for use as interior and exterior trim members of vehicles, or the like.

2. Description of the Prior Art

In order to decrease the weight of automobiles or reduce vibration and noise thereof, it has heretofore been proposed to use fiber-reinforced urethane moldings provided with coating films as interior trim members or at sections of outer panels of vehicle bodies where a high strength is not required.

Figure 1:
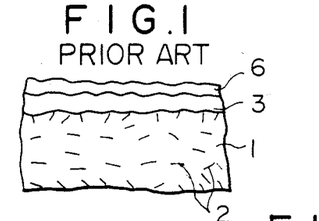
FIG. 1 is a sectional view showing the conventional fiber-reinforced urethane molding provided with coating films.

FIG. 1 is a sectional view showing the conventional fiber-reinforced urethane molding provided with coating films. The conventional fiber-reinforced urethane molding provided with coating films is prepared by applying a urethane coating material onto the surface of a molded urethane layer 1 reinforced by mixing reinforcing fibers 2 thereto, baking the coating layer to form a primer coating film 3, allowing the molded urethane layer 1 and the primer coating film 3 to cool, and then applying a urethane coating material different from that of the primer coating film 3 onto the surface of the primer coating film 3 to form a top coating film 6.

However, in the conventional fiber-reinforced urethane molding provided with coating films, since the primer coating film 3 acting as the substrate for the top coating film 6 is soft, the reinforcing fibers 2 project out of the surface of the molded urethane layer 1 and the surface thereof becomes uneven when the molded urethane layer 1 is allowed to cool and thermally shrinks. As a result, the surface of the primer coating film 3 becomes uneven, and surface roughening arises on the surface of the top coating film 6. When the finish quality of the conventional fiber-reinforced urethane molding provided with coating films is compared with that of a coated steel member of an outer panel of a vehicle body, the latter is generally within the range of 0.7 to 0.8 as expressed by PGD values, but the former is within the range of 0.3 to 0.5. Therefore, when the conventional fiber-reinforced urethane molding provided with coating films and the coated steel member are positioned adjacent to each other, they do not match in appearance.

By the term "PGD value" as used herein is meant a value of distinctness of image gloss as measured by use of an image gloss distinctness meter (PGD meter) wherein images of reference numerals having various sizes are projected onto the surface of a test sample and the readability of the images of the reference numerals projected on the surface of the test sample is measured to evaluate the distinctness of image gloss on the surface of the test sample.

SUMMARY OF THE INVENTION

The primary object of the present invention is to provide a fiber-reinforced urethane molding provided with coating films, which eliminates surface roughening of the top coating film and which exhibits a high distinctness of image gloss.

Another object of the present invention is to provide a fiber-reinforced urethane molding provided with coating films, which matches in appearance with a coated steel.

The specific object of the present invention is to provide a fiber-reinforced urethane molding provided with coating films, which assures elimination of surface roughing of the top coating film even when the molded urethane layer contains a large amount of reinforcing fibers.

The fiber-reinforced urethane molding provided with coating films in accordance with the present invention comprises a molded urethane layer reinforced by inclusion of many reinforcing fibers, and a hard urethane-based coating film overlaid on the surface of said molded urethane layer, said hard urethane-based coating film containing flake-like aluminum dispersed therein in an amount within the range of 5% by weight to 40% by weight.

In one aspect of the present invention, the fiber-reinforced urethane molding provided with coating films comprises a molded urethane layer reinforced by inclusion of many reinforcing fibers, and a hard urethane-based coating film overlaid on the surface of said molded urethane layer, said hard urethane-based coating film containing flake-like aluminum dispersed and settled on the molded urethane layer side in an amount within the range of 5% by weight to 15% by weight. In the fiber-reinforced urethane molding provided with coating films, since the hard urethane-based coating film containing flake-like aluminum dispersed and settled on the molded urethane layer side is overlaid on the molded urethane layer reinforced by the inclusion of reinforcing fibers, it is possible to prevent the reinforcing fibers from projecting out of the surface of the molded urethane layer by the action of the flake-like aluminum when the molded urethane layer is allowed to cool and thermally shrinks in the process of preparing the fiber-reinforced urethane molding provided with coating films. Further, since the hard urethane-based coating film contains the flake-like aluminum in an amount within the range of 5% by weight to 15% by weight, it is possible to obtain a hiding effect sufficient to prevent the projection of the reinforcing fibers. Also, since the flake-like aluminum is not present in the upper portion of the hard urethane-based coating film, protrusions and recesses do not arise on the surface of the coating film. Accordingly, surface roughening does not arise on the surface of a top coating film overlaid on the hard urethane-based coating film, and it becomes possible to improve the distinctness of image gloss of the fiber-reinforced urethane molding provided with coating films so that it matches in appearance with a coated steel.

The aforesaid fiber-reinforced urethane molding provided with coating films which comprises the hard urethane-based coating film containing flake-like aluminum in an amount within the range of 5% by weight to 15% by weight exhibits excellent effects as described above when the amount of the reinforcing fibers contained in the molded urethane layer is up to 10% by weight. However, it was found that a further improvement is desired when the amount of the reinforcing fibers contained in the molded urethane layer is larger than 10% by weight. In this case, it would seem advisable to increase the amount of the flake-like aluminum contained in the hard urethane-based coating film. However, when the amount of the flake-like aluminum is simply increased, the aluminum flakes overlap and the fluidity of the coating material for constituting the hard urethane-based coating film decreases. As a result, fine recesses arise on the surface of the hard urethane-based coating film. Also, the solvent contained in the coating material for constituting the top coating film is absorbed into the fine recesses of the hard urethane-based coating film and corrodes it. Further, the solvent balance in the top coating film is adversely affected, and blur arises in the top coating film.

Accordingly, the present invention also provides a fiber-reinforced urethane molding provided with coating films which comprises a molded urethane layer reinforced by inclusion of many reinforcing fibers, a hard urethane-based primer coating film overlaid on the surface of said molded urethane layer, said hard urethane-based primer coating film containing flake-like aluminum dispersed therein in an amount within the range of 10% by weight to 40% by weight, a hard urethane-based intercoating film overlaid on said primer coating film, and a urethane-based top coating film overlaid on said intercoating film. In the fiber-reinforced urethane molding provided with coating films, projection of the reinforcing fibers out of the surface of the molded urethane layer is prevented by the flake-like aluminum contained in the hard urethane-based primer coating film. Further, surface roughening of the urethane-based top coating film caused by an increase in the amount of the flake-like aluminum contained in the hard urethane-based primer coating film is eliminated by the hard urethane-based intercoating film. Therefore, the fiber-reinforced urethane molding provided with coating films positively prevents surface roughening of the top coating film even when the molded urethane layer contains a large amounts of the reinforcing fibers. Further, the surface of the top coating film of the urethane molding is very smooth, and no blur arises in the top coating film.

In the present invention, the flake-like aluminum should preferably be of the type surface-treated with a surface-active agent to improve the dispersibility in a coating material.

Prior Literature

Japanese Patent Publication No. 51(1976)-16463 discloses a variable color painting method wherein an opaque primer coating film is applied on an article, a colorless or transparent intercoating film containing flat metal or solid particles is applied on the primer coating film so that the particles are scattered but do not opacify the primer coating film. A transparent top coating film of a color different from that of the primer coating film is then applied, whereby the coating films exhibit the color of the top coating film and a mixed color resulting from the color of the top coating film and the color of the primer coating film in accordance with a change in viewing angle. This method does not aim at preventing fibers from projecting out of a molded urethane layer.

Japanese Patent Publication No. 58(1983)-14266 discloses a method of preparing a metallic finish coating by applying a primer coating film (A) by electrodeposition, applying a primer coating film (B) containing metal flakes prior to baking of the primer coating film (A), baking the coating films (A) and (B), and then applying and baking an acrylic particle top coating material. This method is different from the idea of using flake-like aluminum for preventing fibers from projecting out of a molded urethane layer.

DESCRIPTION OF THE PREFERRED EMBODIMENTS

The present invention will hereinbelow be described in further detail with reference to the accompanying drawings.

Referring to FIGS. 2A to 2D, a molded urethane layer 1 contains up to 10% by weight of glass fibers (or mineral fibers) 2 having lengths within the range of 1/16 inch to ⅛ inch as the reinforcing fibers. The molded urethane layer 1 is prepared, for example, by reinforced-reaction injection molding.

Figure 2A:
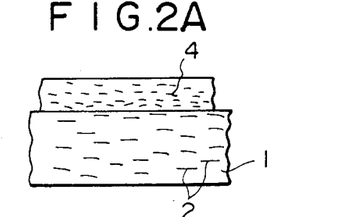
FIGS. 2A, 2B, 2C and 2D are sectional views showing the coating sequence for the preparation of an embodiment of the fiber-reinforced urethane molding provided with coating films in accordance with the present invention.
Figure 2B:
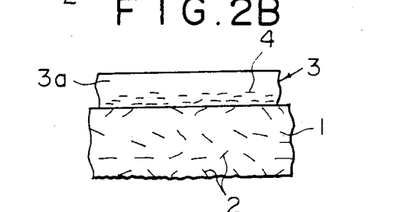

As shown in FIG. 2A, a urethane-based primer is applied onto the surface of the molded urethane layer 1. The urethane-based primer contains flake-like aluminum 4 exhibiting good compatibility with the primer and dispersed and settled on the side of the molded urethane layer 1. After the primer is applied, the primer layer and the molded urethane layer 1 are allowed to cool to form a primer coating film 3 containing the flake-like aluminum 4 in an amount within the range of 5% by weight to 15% by weight as shown in FIG. 2B. The flake-like aluminum 4 is settled toward the bottom of the primer coating film 3. Therefore, the glass fibers 2 are prevented by the flake-like aluminum 4 from projecting out of the surface of the molded urethane layer 1 when the molded urethane layer 1 shrinks thermally.

When the primer coating film 3 is soft, the action of preventing the glass fibers 2 from projecting out of the surface of the molded urethane layer 1 cannot be expected. Therefore, the primer coating film 3 should be a hard urethane-based coating film. Also, when the primer coating film 3 exhibits a rate of elongation of less than 10%, it cannot follow the thermal shrinkage of the molded urethane layer 1 and cracks when the primer coating film 3 and the molded urethane layer 1 are allowed to cool. Therefore, the hardness of the primer coating film 3 should preferably be such that the rate of elongation is within the range of approximately 10% to approximately 150%. The application of the primer onto the molded urethane layer 1 may be conducted by a spraying process wherein the primer is applied by spraying onto the molded urethane layer 1 after the molding thereof, or by a mold coating process wherein the primer is applied by spraying onto a mold surface before the molding of the urethane layer 1.

Figure 2C:
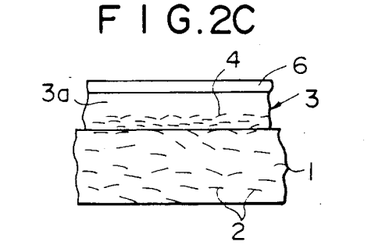

In FIG. 2C, a top coating film 6 is applied and baked on the upper surface of the primer coating film 3. Since the flake-like aluminum 4 is dispersed and settled in the primer coating film 3, the glass fibers 2 are prevented from projecting out of the surface of the molded urethane layer 1. Further, since the flake-like aluminum 4 is not present at the upper portion 3a of the primer coating film 3, the upper surface of the primer coating film 3 is smooth.

Figure 2D:
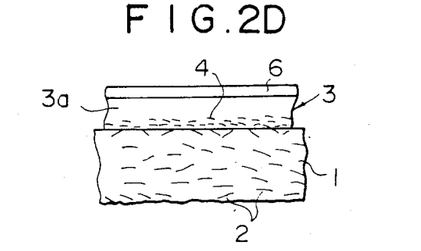

FIG. 2D shows the fiber-reinforced urethane molding after the top coating film 6 is applied, baked, and then allowed to cool. Since the surface of the top coating film 6 conforms to the shape of the upper surface of the primer coating film 3, it is formed smooth.

Table 1 shows the compositions of various two-pack urethane primers. Table 2 shows the coating conditions of the primer coating film 3 (applied by a spraying process) and the top coating film 6 used in experiments.

TABLE 1

| | Type Composition | | | | | |
|---|---|---|---|---|---|---|
| | Primer A | | Primer L | | Primer S | |
| | | parts by weight | | parts by weight | | parts by weight |
| Resin | Acrylic polyol | 100 | Acrylic polyol | 100 | Acrylic polyol | 100 |
| Curing agent | Aliphatic isocyanate | 20 | Aliphatic isocyanate | 20 | Aliphatic isocyanate | 20 |
| Pigment (aluminum type) | Aluminum A | 12 | Aluminum L | 13 | Aluminum S | 13 |
| Solvent | Aliphatic ester | 15 | Aliphatic ester | 15 | Aliphatic ester | 15 |
| | Aliphatic ketone | 72 | Aliphatic ketone | 72 | Aliphatic ketone | 72 |
| | Aromatic hydrocarbon | 13 | Aromatic hydrocarbon | 13 | Aromatic hydrocarbon | 13 |

TABLE 2

| | Two-pack urethane primer coat | One-pack urethane top coat | | Two-pack urethane top coat | |
|---|---|---|---|---|---|
| | | Solid | Metallic | Solid | Metallic |
| Viscosity | 16–18 sec./ Ford Cup No. 4/ 20° C. | 14–15 sec./ Ford Cup No. 4/ 20° C. | 13–14 sec./ Ford Cup No. 4/ 20° C. | 12–13 sec./ Ford Cup No. 4/ 20° C. | 12–13 sec./ Ford Cup No. 4/ 20° C. |
| Film thickness | 30–40µ | 35–45µ | 20–30µ/ 30–40µ | 25–35µ | 20–25µ/ 30–35µ |
| Setting time | 10 min. | 5 min.* | 15 min. | 10 min. | |
| Baking conditions | 30 min. at 80° C. | — | 30 min. at 120° C. | 30 min. at 90° C. | |

In this table, by "setting time" is meant the time for which the coating material is allowed to stand for removal of the solvent after the coating material is applied.
*This indicates the setting time for which the coating material is allowed to stand after it is applied by a mold coating process.

In Table 1, the primer A is a coating material containing aluminum particles for general silver metallic finish which have an ordinary size distribution (the mean particle size is approximately 10µ). The primer L is a coating material containing rough type aluminum particles which have comparatively rough surfaces, and the primer S is a coating material containing fine type aluminum particles which have smoothly extended and polished surfaces.

Figure 3:
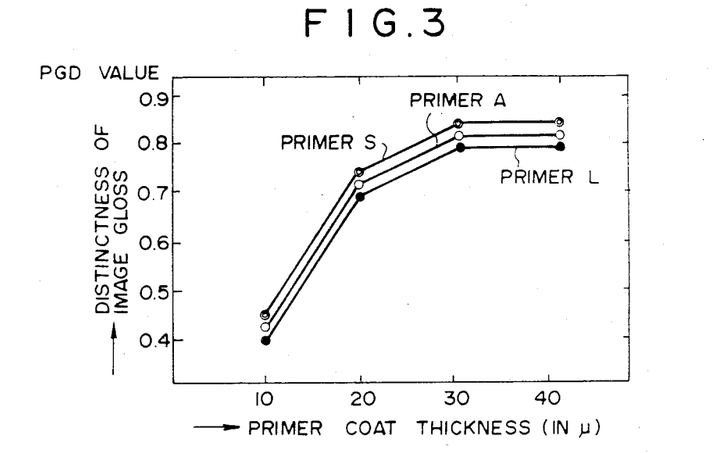
FIG. 3 is a graph showing the relationship between the thickness of the primer coating film and the distinctness of image gloss of the fiber-reinforced urethane molding provided with coating films as shown in FIGS. 2A to 2D.

FIG. 3 shows the relationship between the thickness of the primer coating film and the distinctness of image gloss (as expressed by a PGD value) of the fiber-reinforced urethane molding provided with coating films as shown in FIGS. 2A to 2D. The results as shown in FIG. 3 were obtained by using the molded urethane layer 1 containing 10% by weight of glass fibers 2, applying the primer coating film 3 thereon by use of the primer A, the primer L or the primer S in each case, and then applying a 40µ-thick red coating film as the top coating film 6 by use of, e.g. a melamine crosslinkable one-pack urethane coating material as listed in Table 2. As is clear from FIG. 3, good finish with a GPD value of higher than 0.8 is obtained when the thickness of the primer coating film 3 is approximately 25µ or more.

Figure 4:
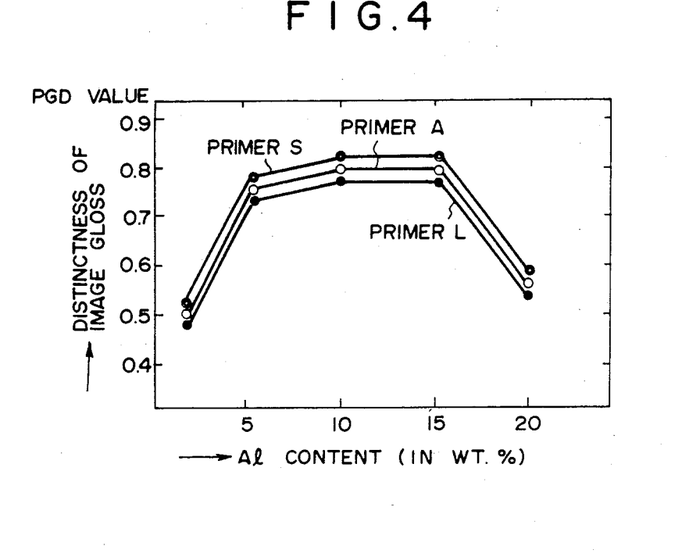
FIG. 4 is a graph showing the relationship between the amount of flake-like aluminum contained in the primer coating film and the distinctness of image gloss of the fiber-reinforced urethane molding provided with coating films as shown in FIGS. 2A to 2D, FIGS. 5A and 5B are sectional views showing the coating sequence for the preparation of another embodiment of the fiber-reinforced urethane molding provided with coating films in accordance with the present invention.

FIG. 4 shows the relationship between the content of flake-like aluminum 4 in the primer coating film 3 after the solvent is removed therefrom and distinctness of image gloss when the thickness of the primer coating film 3 is maintained constant at 40μ (the compositions of the molded urethane layer 1 and the top coating film 6 are the same as in FIG. 3). As shown in FIG. 4, the PGD value is low when the content of the flake-like aluminum 4 is lower than 5% by weight and when it is higher than 15% by weight. On the other hand, when the content of the flake-like aluminum 4 is within the range of 5% by weight to 15% by weight, good finish exhibiting a sufficiently high, approximately constant PGD value is obtained. Specifically, when the content of the flake-like aluminum 4 is lower than 5% by weight, a sufficient hiding effect of preventing the glass fibers 2 from projecting out of the surface of the molded urethane layer 1 cannot be obtained. When the content of the flake-like aluminum 4 is higher than 15% by weight, since the flake-like aluminum 4 is present also at the upper portion 3a of the primer coating film 3, the PGD value becomes low.

Further, when the primer A was applied as the primer coating film 3 on the molded urethane layer 1 containing 10% by weight of the glass fibers 2, and a 30μ-thick red coating film was applied by use of a two-pack urethane coating material as listed in Table 2 as the top coating film 6, the PGD value was 0.8 and thus high distinctness of image gloss was obtained.

Also, when the primer coating film 3 was formed by a mold coating process by use of a primer having the primer composition for a spraying process as shown in Table 1 and further added with 0.5 part by weight of a tin-based fatty acid salt as the catalyst, nearly the same results as those shown in FIGS. 3 and 4 were obtained. Thus it was found that, when the primer coating film 3 contains the flake-like aluminum 4 in an amount within the range of 5% by weight to 15% by weight, the fiber-reinforced urethane molding provided with coating films as shown in FIGS. 2A to 2D exhibits high distinctness of image gloss.

Figure 5A:
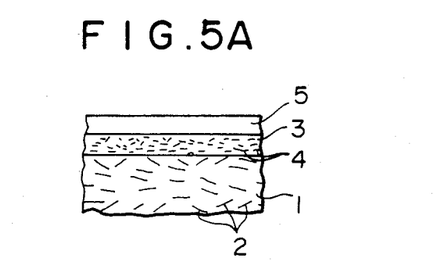
Figure 5B:
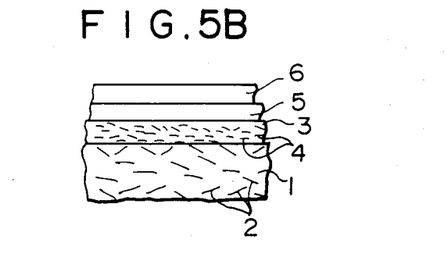

FIGS. 5A and 5B show the coating sequence for the preparation of another embodiment of the fiber-reinforced urethane molding provided with coating films in accordance with the present invention. The molded urethane layer 1 contains the glass fibers (or mineral fibers) 2 as the reinforcing fibers in an amount within the range of 15% by weight to 25% by weight. The glass fibers 2 have lengths within the range of 1/16 inch to ⅛ inch. The molded urethane layer 1 is prepared, for example, by reinforced-reaction injection molding. A hard urethane-based primer is applied onto the surface of the molded urethane layer 1 to form the primer coating film 3. The primer coating film 3 contains flake-like aluminum 4 exhibiting good compatibility with the primer and dispersed therein in an amount within the range of 10% by weight to 40% by weight. On the surface of the primer coating film 3 is applied a hard urethane-based coating material to form a sealer coating film 5. Further, a urethane-based coating material different from those of the primer coating film 3 and the sealer coating film 5 is applied and baked to form the top coating film 6 on the surface of the sealer coating film 5. The sealer coating film 5 may also contain the flake-like aluminum. When the primer coating film 3 and sealer coating film 5 exhibit a rate of elongation lower than 10%, they cannot follow thermal shrinkage of the molded urethane layer 1 and are cracked when the molded urethane layer 1 is allowed to cool. Therefore, the primer coating film 3 and the sealer coating film 5 should preferably be hard coating films respectively exhibiting rates of elongation within the range of 10% to 140% and within the range of 10% to 160%. The application of the primer coating film 3 and the sealer coating film 5 may be conducted by a spraying process wherein the primer and the sealer are applied by spraying onto the molded urethane layer 1 after the molding thereof, or by a mold coating process wherein they are applied by spraying onto a mold surface before the molding of the urethane layer 1. In any case, the primer coating film 3 and the sealer coating film 5 are applied by wet-on-wet method, and then hardened together for a period within the range of 2 minutes to 10 minutes at a temperature within the range of 60° to 80° in the case of the mold coating process, or for a period within the range of 30 minutes to 40 minutes at a temperature within the range of 60° to 120° in the case of the spraying process. That is, one baking is conducted after two coatings.

Figure 6A:
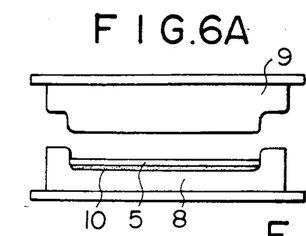
FIGS. 6A, 6B and 6C are schematic views showing the coating steps of a mold coating process for preparing the fiber-reinforced urethane molding provided with coating films as shown in FIGS. 5A and 5B.
Figure 6B:
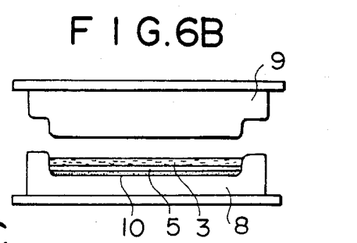
Figure 6C:
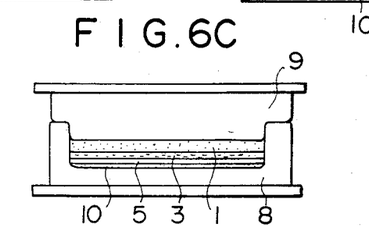
Figure 7:
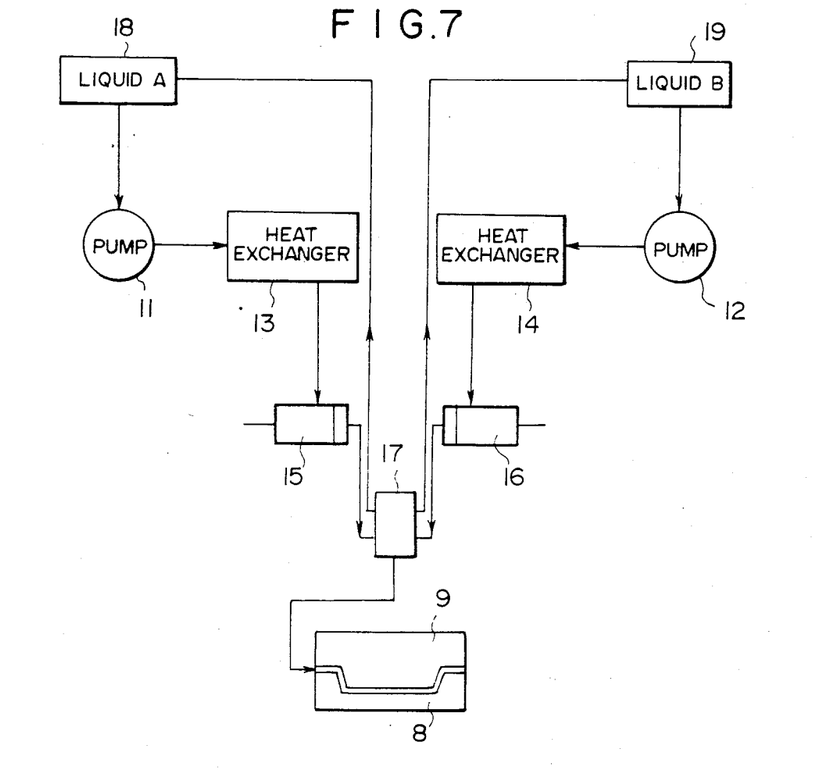
FIG. 7 is a schematic view showing the configuration of the raw material injection apparatus used for reinforced-reaction injection molding by the mold coating process.

The method of forming the primer coating film 3 and the sealer coating film 5 by the mold coating process will further be described with reference to FIGS. 6A, 6B, 6C and 7. FIGS. 6A, 6B and 6C show the coating steps of the mold coating process, and FIG. 7 shows the raw material injection apparatus used for reinforced-reaction injection molding by the mold coating process.

In the mold coating process, a releasing agent 10 is first applied on the mold surface of a mold half 8 used for the molding of the molded urethane layer 1. Then, a urethane coating material is sprayed onto the layer of the releasing agent 10 and setting is conducted to form the sealer coating film 5 as shown in FIG. 6A. A urethane coating material is then sprayed onto the sealer coating film 5 and setting is conducted to form the primer coating film 3 as shown in FIG. 6B. Thereafter, as shown in FIG. 6C, mold halves 8 and 9 are closed, and the sealer coating film 5 and the primer coating film 3 are hardened by the temperature of the mold. At this time, in the raw material injection apparatus as shown in FIG. 7, liquid A and liquid B are independently circulated through a route comprising a pump 11, a heat exchanger 13, a cylinder 15, a mixing head 17 and a tank 18, and a route comprising a pump 12, a heat exchanger 14, a cylinder 16, the mixing head 17 and a tank 19. When the mixing head 17 is activated, the liquid A and the liquid B are mixed together at the mixing head 17, and injected into the cavity between the closed mold halves 8 and 9. In this manner, the molded urethane layer 1 containing the reinforcing fibers is formed on the primer coating film 3 as shown in FIG. 6C. The mold halves 8 and 9 are then opened and the molded product is taken out to obtain the fiber-reinforced urethane molding as shown in FIG. 5A. Table 3 shows the compositions and the coating conditions of the primer coating film 3 and the sealer coating film 5, and the type of the top coating film 6 in the mold coating process, and Table 4 shows those in the spray coating process.

TABLE 3

| | | | Mold coating process | |
|---|---|---|---|---|
| Primer (grey) | Composition (in parts by weight) | Resin | Acrylic polyol | 100 |
| | | Curing agent | Aliphatic isocyanate | 20 |
| | | Pigment | Aluminum | 12 |
| | | | Talc, titanium oxide | 3 |

TABLE 3-continued

| | | | Mold coating process | |
|---|---|---|---|---|
| | | Catalyst | Aliphatic amine | 0.5 |
| | | Solvent | Aromatic hydrocarbon (with high boiling point) | 80 |
| | Conditions | Viscosity | 16-18 sec./Ford Cup No. 4/20° C. | |
| | | Film thickness | 15-25μ | |
| Sealer (grey) | Composition (in parts by weight) | Resin | Acrylic polyol | 100 |
| | | Curing agent | Aliphatic isocyanate | 20 |
| | | Pigment | Talc, titanium oxide | 3 |
| | | Catalyst | Aliphatic amine | 0.5 |
| | | Solvent | Aromatic hydrocarbon (with medium boiling point) Aliphatic hydrocarbon | 80 |
| | Conditions | Viscosity | 15-17 sec./Ford Cup No. 4/20° C. | |
| | | Film thickness | 25-35μ | |
| | | Primer-sealer intervals | 30-60 sec. | |
| | | Setting time | 5 min. | |
| | | Hardening temperature | 78° C. | |
| Top Coat | Type | | One-pack urethane coating material: 30 min. at 120° C. Two-pack urethane coating material: 30 min. at 120° C. | |

TABLE 4

| | | | Spraying process | |
|---|---|---|---|---|
| Primer (grey) | Composition (in parts by weight) | Resin | Acrylic polyol | 100 |
| | | Curing agent | Aliphatic isocyanate | 20 |
| | | Pigment | Aluminum | 12 |
| | | | Talc, titanium oxide | 3 |
| | | Solvent | Aromatic hydrocarbon (with low boiling point) Aromatic ketone, ester | 80 |
| | Conditions | Viscosity | 16-18 sec./Ford Cup No. 4/20° C. | |
| | | Film thickness | 20-30μ | |
| Sealer (grey) | Composition (in parts by weight) | Resin | Acrylic polyol | 100 |
| | | Curing agent | Aliphatic isocyanate | 20 |
| | | Pigment | Talc, titanium oxide | 3 |
| | | Solvent | Aromatic hydrocarbon (with low boiling point) Aromatic ketone, ester | 80 |
| | Conditions | Viscosity | 13-14 sec./Ford Cup No. 4/20° C. | |
| | | Film thickness | 30-50μ | |
| | | Primer-sealer intervals | 2 min. | |
| | | Setting time | 10 min. | |
| | | Baking conditions | 30 min. at 120° C. | |
| Top coat | Type | | One-pack urethane coating material: 30 min. at 120° C. Two-pack urethane coating material: 30 min. at 120° C. | |

The reasons why the content of the flake-like aluminum 4, the film thicknesses of the primer coating film 3 and the sealer coating film 5 are adjusted as shown in Tables 3 and 4 will hereinbelow be described.

(i) Content of the flake-like aluminum 4

When the content of the flake-like aluminum 4 in the primer coating film 3 is lower than 10% by weight, the effect of preventing the glass fibers 2 from projecting out of the surface of the molded urethane layer 1 is small, and surface roughening arises in the top coating film 6. When the content of the flake-like aluminum 4 is higher than 40% by weight, flexibility of the primer coating film 3 decreases and the primer coating film 3 cracks.

(ii) Film thickness of the primer coating film 3

(a) In the mold coating process, when the thickness of the primer coating film 3 is smaller than 15μ, the effect of preventing the glass fibers 2 from projecting out of the surface of the molded urethane layer 1 is small, and the primer coating film 3 partially exhibits bubbling and becomes nonuniform. When the thickness of the primer coating film 3 is larger than 25μ, the primer coating film 3 exhibits sags and becomes nonuniform. Further, the solvent is not readily removed from the primer coating film 3, and the film surface becomes rough.

(b) In the spraying process, when the thickness of the primer coating film 3 is smaller than 20μ, the primer coating film 3 becomes nonuniform and the effect of preventing the glass fibers 2 from projecting out of the surface of the molded urethane layer 1 becomes small. When the film thickness is larger than 30μ, the same problems as those arising in the mold coating process when the film thickness is larger than 25μ arise.

(iii) Film thickness of the sealer coating film 5

(a) In the mold coating process, when the thickness of the sealer coating film 5 is smaller than 25μ, the sealer coating film 5 exhibits bubbling and becomes nonuniform. Also, it becomes impossible to eliminate the adverse effect of surface roughening of the primer coating film 3. When the film thickness is larger than 35μ, the same problems as those arising when the thickness of the primer coating film 3 is larger than 25μ arise.

(b) In the spraying process, when the thickness of the sealer coating film 5 is smaller than 30μ, the sealer coating film 5 cannot eliminate the adverse effect of surface roughening of the primer coating film 3 and becomes nonuniform. When the film thickness is larger than 50μ, the same problems as those arising in the mold coating process when the thickness of the primer coating film 3 is larger than 25μ arise.

The effects of the embodiment of the fiber-reinforced urethane molding provided with coating films as shown in FIG. 5B will hereinbelow be described.

In this embodiment, even when a large amount of the glass fibers 2 are contained in the molded urethane layer 1, projection of the glass fibers 2 out of the surface of the molded urethane layer 1 is prevented by the flake-like aluminum 4 contained in an amount within the range of 10% by weight to 40% by weight in the primer coating film 3. Further, this effect of the flake-like aluminum 4 is secured by the action of the hard primer coating film 3 in which the flake-like aluminum 4 is contained.

Also, since the sealer coating film 5 overlaid on the primer coating film 3 is hard, the top coating film 6 is not adversely affected by surface roughening of the primer coating film 3 even though the surface of the primer coating film 3 is roughened by the flake-like aluminum 4. Further, since the three layers, i.e. the primer coating film 3, the sealer coating film 5 and the top coating film 6, are overlaid, the surface of the top coating film 6 becomes very smooth by the overlaying effect.

Further, absorption of the solvent of the top coating film 6 into the surface of the primer coating film 3 is prevented by the sealer coating film 5 and, therefore, no blur arises in the top coating film 6.

Experiments were conducted to investigate the finish quality of the fiber-reinforced urethane molding provided with coating films as shown in FIG. 5B, wherein the molded urethane layer 1 contains the glass fibers in an amount within the range of 15% by weight to 20% by weight. The results of the experiments are shown in Table 5. As is shown in Table 5, the PGD value is within the range of 0.7 and 0.8 in both cases where the amounts of the glass fibers 2 contained in the molded urethane layer 1 are 15% by weight and 20% by weight. Thus a good finish quality nearly equal to that of an ordinary steel body provided with the coating films was obtained.

TABLE 5

| Top coat | | Contents of glass fibers | |
|---|---|---|---|
| | | 15% by weight | 20% by weight |
| One-pack urethane coating material | Solid | 0.7 | 0.7 |
| | Metallic | 0.7 | 0.7 |
| Two-pack urethane coating material | Solid | 0.8 | 0.8 |
| | Metallic | 0.8 | 0.8 |

In the aforesaid finish quality experiments, coating on the molded urethane layer 1 was conducted as described below.

(i) Primer coating film 3 and sealer coating film 5

To form the primer coating film 3 and the sealer coating film 5, the primer and the sealer having the compositions as shown in Table 4 were applied by the spraying process and baked under the conditions as shown in Table 4. The thickness of the primer coating film 3 was 25μ, and that of the sealer coating film 5 was 40μ.

(ii) Top coating film 6

The top coating film 6 was formed by using the coating materials as listed in Table 6 under the coating conditions as listed in Table 7. The coating color was red both for the solid finish and the metallic finish. In Table 7, the setting time is the time for which the coating film is allowed to stand for removal of the solvent after the coating film is applied.

TABLE 6

| One-pack urethane coating material | | Two-pack urethane coating material | | |
|---|---|---|---|---|
| Solid | Melamine crosslinkable one-pack urethane coating material | Solid | Crosslinkable two-pack coating material based on polyester | |
| Metallic | Me base | Same as that for solid finish (containing flake-like aluminum) | Metallic | Me base | Crosslinkable two-pack coating material based on acrylic polyol and isocyanate (containing flake-like aluminum) |
| | Clear | Same as that for solid finish | | Clear | Same as that for solid finish |

TABLE 7

| | One-pack urethane top coat | | Two-pack urethane top coat | |
|---|---|---|---|---|
| | (Solid) | (Metallic) | (Solid) | (Metallic) |
| Viscosity | 14–15 sec./Ford Cup No. 4/20° C. | 13–14 sec./Ford Cup No. 4/20° C. | 12–13 sec./Ford Cup No. 4/20° C. | 12–13 sec./Ford Cup No. 4/20° C. |
| Film thickness | 40μ | 25 μMe base/clear 35μ | 30μ | 25 μMe base/clear 35μ |
| Setting time | 15 min. | | 10 min. | |
| Baking conditions | 30 min. at 120° C. | | 30 min. at 120° C. | |

Figure 8:
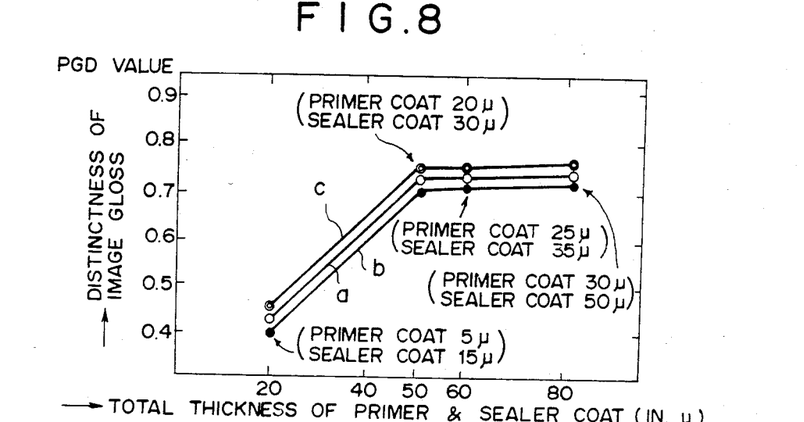
FIGS. 8, 9 and 10 are graphs respectively showing the relationships between the total thickness of the primer coating film and the sealer coating film and the distinctness of image gloss, between the amount of flake-like aluminum contained in the primer coating film and the distinctness of image gloss, and between the amount of flake-like aluminum contained in the primer coating film and the low-temperature flexibility of the fiber-reinforced urethane molding provided with coating films as shown in FIGS. 5A and 5B.

Furthermore, experiments were conducted to investigate the relationship between the total thickness of the primer coating film 3 and the sealer coating film 5 and the distinctness of image gloss, and the relationship between the amount of aluminum contained in the primer coating film 3 and the distinctness of image gloss. In these experiments, three types of aluminum which are usable in a coating material were used. FIG. 8 shows the results of the experiments conducted on the relationship between the total thickness of the primer coating film 3 and the sealer coating film 5 and the distinctness of image gloss. In FIG. 8, the full line a indicates the results of experiments using the primer coating film 3 containing aluminum particles for general silver metallic finish which have a mean particle size of approximately 1μ. The full line b indicates the results of experiments using the primer coating film 3 containing aluminum particles which have comparatively rough surfaces, and the full line c indicates those using the primer coating film 3 containing aluminum particles which have smoothly extended and polished surfaces. Also, in the experiments conducted for investigating the relationship between the total thickness of the primer coating film 3 and the sealer coating film 5 and the distinctness of image gloss, application of the primer coating film 3 and the sealer coating film 5 was conducted by the spraying process, and a red one-pack urethane coating material was applied to obtain the top coating film 6 having a thickness of 35μ. Also, the molded urethane layer 1 contained 20% by weight of the glass fibers 2 and was obtained by the reinforced-reaction injection molding. The aluminum content in the primer coating film 3 was 10% by weight.

As is clear from FIG. 8, a good finish quality exhibiting a PGD value within the range of 0.7 to 0.8 is obtained regardless of the type of aluminum when the thicknesses of the primer coating film 3 and the sealer coating film 5 are respectively 20μ or larger and 30μ or larger.

Figure 9:
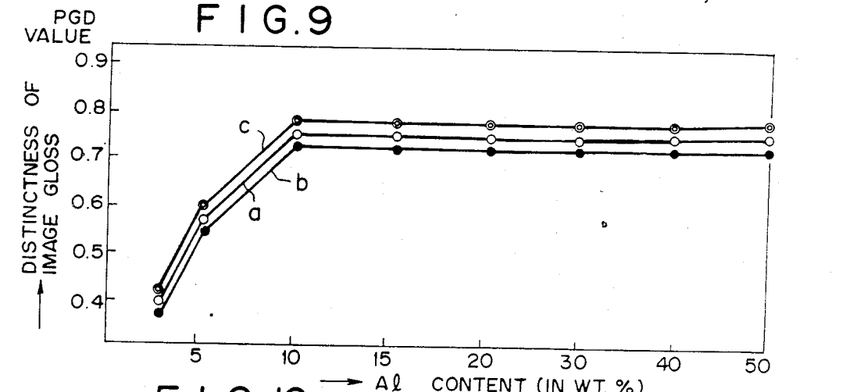

FIG. 9 shows the results of experiments conducted for investigating the relationship between the amount of aluminum contained in the primer coating film 3 and the distinctness of image gloss. In FIG. 9, the full lines a, b and c indicate the results of experiments using the primers containing the same types of aluminum as those described with respect to full lines a, b and c of FIG. 8. The type and the thickness of the top coating film 6 and the molded urethane layer 1 were the same as those in the experiments conducted for investigating the relationship between the total thickness of the primer coating film 3 and the sealer coating film 5 and the distinctness of image gloss. The thickness of the primer coating film 3 was 25μ, and that of the sealer coating film 5 was 35μ.

As is clear from FIG. 9, a good finish quality exhibiting a PGD value within the range of 0.7 to 0.8 is obtained regardless of the type of aluminum when the amount of aluminum contained in the primer coating film 3 is 10% by weight or more.

Figure 10:
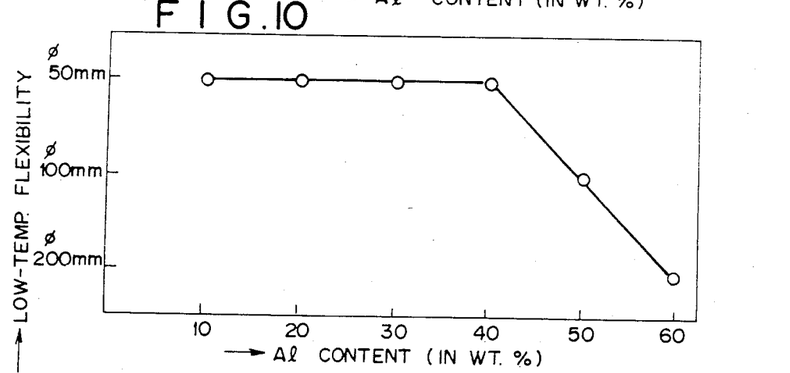

Experiments were further conducted to investigate the relationship between the amount of aluminum contained in the primer coating film 3 and the low-temperature flexibility (at −30° C.) of the primer coating film 3. In the experiments, a primer coating film 3 having a thickness of 20μ, a sealer coating film 5 having a thickness of 30μ and a top coating film 6 having a thickness of 30μ were overlaid on test pieces having a width of 20 mm and a length of 250 mm. The test pieces were wound around cylinders having diameters of 50 mm, 100 mm and 200 mm, and cracking of the coating film surface was determined to evaluate the flexibility. FIG. 10 shows the results of the experiments. As is clear from FIG. 10, low-temperature flexibility decreases markedly when the amount of aluminum contained in the primer coating film 3 is larger than 40% by weight. Accordingly, though the amount of aluminum contained in the primer coating film 3 should be 10% by weight or larger from the viewpoint of the distinctness of image gloss, it should be within the range of 10% by weight to 40% by weight when the low-temperature flexibility is considered.

We claim:

1. A fiber-reinforced urethane molding provided with coating films, which comprises a molded urethane layer reinforced by inclusion of many reinforcing fibers, and a hard urethane-based coating film overlaid on the surface of said molded urethane layer, said hard urethane-based coating film containing flake-like aluminum dispersed therein in an amount within the range of 5% by weight to 40% by weight.

2. A fiber-reinforced urethane molding provided with coating films, which comprises a molded urethane layer reinforced by inclusion of many reinforcing fibers, and a hard urethane-based coating film overlaid on the surface of said molded urethane layer, said hard urethane-based coating film containing flake-like aluminum dispersed and settled on the molded urethane layer side in an amount within the range of 5% by weight to 15% by weight.

3. A fiber-reinforced urethane molding provided with coating films as defined in claim 2 wherein said molded urethane layer contains said reinforcing fibers in an amount of 10% by weight or less.

4. A fiber-reinforced urethane molding provided with coating films as defined in claim 2 wherein said hard urethane-based coating film exhibits a rate of elongation within the range of 10% to 150%.

5. A fiber-reinforced urethane molding provided with coating films as defined in claim 2 wherein a top coating film is overlaid on said hard urethane-based coating film.

6. A fiber-reinforced urethane molding provided with coating films as defined in claim 2 wherein said hard urethane-based coating film has a film thickness of 25μ or more.

7. A fiber-reinforced urethane molding provided with coating films as defined in claim 2 wherein said hard urethane-based coating film is formed by a spraying process.

8. A fiber-reinforced urethane molding provided with coating films as defined in claim 2 wherein said hard urethane-based coating film is formed by a mold coating process.

9. A fiber-reinforced urethane molding provided with coating films as defined in claim 2 wherein said molded urethane layer is formed by reinforced-reaction injection molding.

10. A fiber-reinforced urethane molding provided with coating films, which comprises a molded urethane layer reinforced by inclusion of many reinforcing fibers, a hard urethane-based primer coating film overlaid on the surface of said molded urethane layer, said hard urethane-based primer coating film containing flake-like aluminum dispersed therein in an amount within the range of 10% by weight to 40% by weight, a hard urethane-based intercoating film overlaid on said primer coating film, and an urethane-based top coating film overlaid on said intercoating film.

11. A fiber-reinforced urethane molding provided with coating films as defined in claim 10 wherein said molded urethane layer contains said reinforcing fibers in an amount within the range of 15% by weight to 25% by weight.

12. A fiber-reinforced urethane molding provided with coating films as defined in claim 10 wherein said hard urethane-based coating film exhibits a rate of elongation within the range of 10% to 140%.

13. A fiber-reinforced urethane molding provided with coating films as defined in claim 10 wherein said hard urethane-based intercoating film exhibits a rate of elongation within the range of 10% to 160%.

14. A fiber-reinforced urethane molding provided with coating films as defined in claim 10 wherein said hard urethane-based primer coating film and said hard urethane-based intercoating film are formed by a mold coating process.

15. A fiber-reinforced urethane molding provided with coating films as defined in claim 14 wherein said hard urethane-based primer coating film has a film thickness within the range of 15μ to 25μ.

16. A fiber-reinforced urethane molding provided with coating films as defined in claim 14 wherein said hard urethane-based intercoating film has a film thickness within the range of 25μ to 35μ.

17. A fiber-reinforced urethane molding provided with coating films as defined in claim 10 wherein said hard urethane-based primer coating film and said hard urethane-based intercoating film are formed by a spraying process.

18. A fiber-reinforced urethane molding provided with coating films as defined in claim 17 wherein said hard urethane-based primer coating film has a film thickness within the range of 20μ to 30μ.

19. A fiber-reinforced urethane molding provided with coating films as defined in claim 17 wherein said hard urethane-based intercoating film has a film thickness within the range of 30μ to 50μ.

20. A fiber-reinforced urethane molding provided with coating films as defined in claim 10 wherein said molded urethane layer is formed by reinforced-reaction injection molding.

* * * * *